United States Patent [19]

Taylor

[11] Patent Number: 5,056,737

[45] Date of Patent: Oct. 15, 1991

[54] VTOL AIRCRAFT WITH MOVABLE UNDERCARRIAGE

[75] Inventor: Douglas R. Taylor, Cliftonville, England

[73] Assignee: Gec-Marconi Limited, England

[21] Appl. No.: 499,809

[22] Filed: Mar. 27, 1990

[30] Foreign Application Priority Data

Apr. 5, 1989 [GB] United Kingdom ............... 8907643

[51] Int. Cl.⁵ .................... B64C 29/00; B64C 25/32
[52] U.S. Cl. ................... 244/7 B; 244/109; 244/100 R
[58] Field of Search .......... 244/100 R, 109, 202, 244/110 A, 7 B, 110 R

[56] References Cited

U.S. PATENT DOCUMENTS

| | | | |
|---|---|---|---|
| 1,362,292 | 12/1920 | Gunderson | 244/7 B |
| 2,678,783 | 5/1954 | Myers | 244/7 B |
| 2,712,420 | 7/1955 | Amster et al. | 244/100 R |
| 2,868,477 | 1/1959 | Chaplin | 244/100 R |

FOREIGN PATENT DOCUMENTS 468063 6/1937 United Kingdom ............... 244/7 B
976296 11/1964 United Kingdom .

Primary Examiner—Joseph F. Peters, Jr.
Assistant Examiner—Carla Mattix
Attorney, Agent, or Firm—Kirschstein, Ottinger, Israel & Schiffmiller

[57] ABSTRACT

A vertical take-off and landing aircraft is configured so as to provide, when landing tail-first with its fuselage (1) in a generally vertical attitude, a touchdown area (21) at the tail of the aircraft at a position offset from a line extending along the length of the fuselage through the centre of gravity (23) of the aircraft such that after the touchdown area contacts a landing surface the aircraft topples under the action of gravity to bring an undercarriage (11, 13) of the aircraft into contact with the landing surface, thereby to attain a stable landed position.

11 Claims, 5 Drawing Sheets

VTOL AIRCRAFT WITH MOVABLE UNDERCARRIAGE

BACKGROUND OF THE INVENTION

Field of the Invention

This invention relates to aircraft.

More particularly the invention relates to vertical take-off and landing (VTOL) aircraft of the kind which are designed to land tail-first with their fuselage in a generally vertical attitude.

In this attitude the aircraft is top-heavy and is therefore liable to tip over if the landing is taking place on an uneven surface, or a tilting surface such as the deck of a ship.

SUMMARY OF THE INVENTION

It is an object of the present invention to provide a VTOL aircraft wherein this problem is overcome.

According to the present invention there is provided a VTOL aircraft configured so as to provide, when landing tail-first with its fuselage in a generally vertical attitude a touchdown area at the tail of the aircraft at a position offset from a line extending along the length of the fuselage through the centre of gravity of the aircraft such that after the touchdown area contacts a landing surface the aircraft topples under the action of gravity to bring an undercarriage means of the aircraft into contact with the landing surface, thereby to attain a stable landed position.

Preferably the undercarriage means is arranged to contact the landing surface at a relatively early stage of toppling and is movable with respect to the fuselage so that, as the aircraft topples further, the area or areas of contact between the landing surface and undercarriage means move towards the nose of the aircraft. Preferably the undercarriage means also incorporates means for cushioning the impact of the undercarriage with the landing surface.

Preferably the aircraft is further configured so as to provide buffer means arranged to limit, by contact with the landing surface, the possible degree of toppling of the aircraft in directions other than that required to bring the undercarriage means into contact with the landing surface. The buffer means suitably comprises two buffer areas one on either side of the fuselage.

BRIEF DESCRIPTION OF THE DRAWINGS

One aircraft in accordance with the invention will now be described, by way of example, with reference to the accompanying drawings in which.

DETAILED DESCRIPTION OF THE PREFERRED EMBODIMENTS

Figure 1:
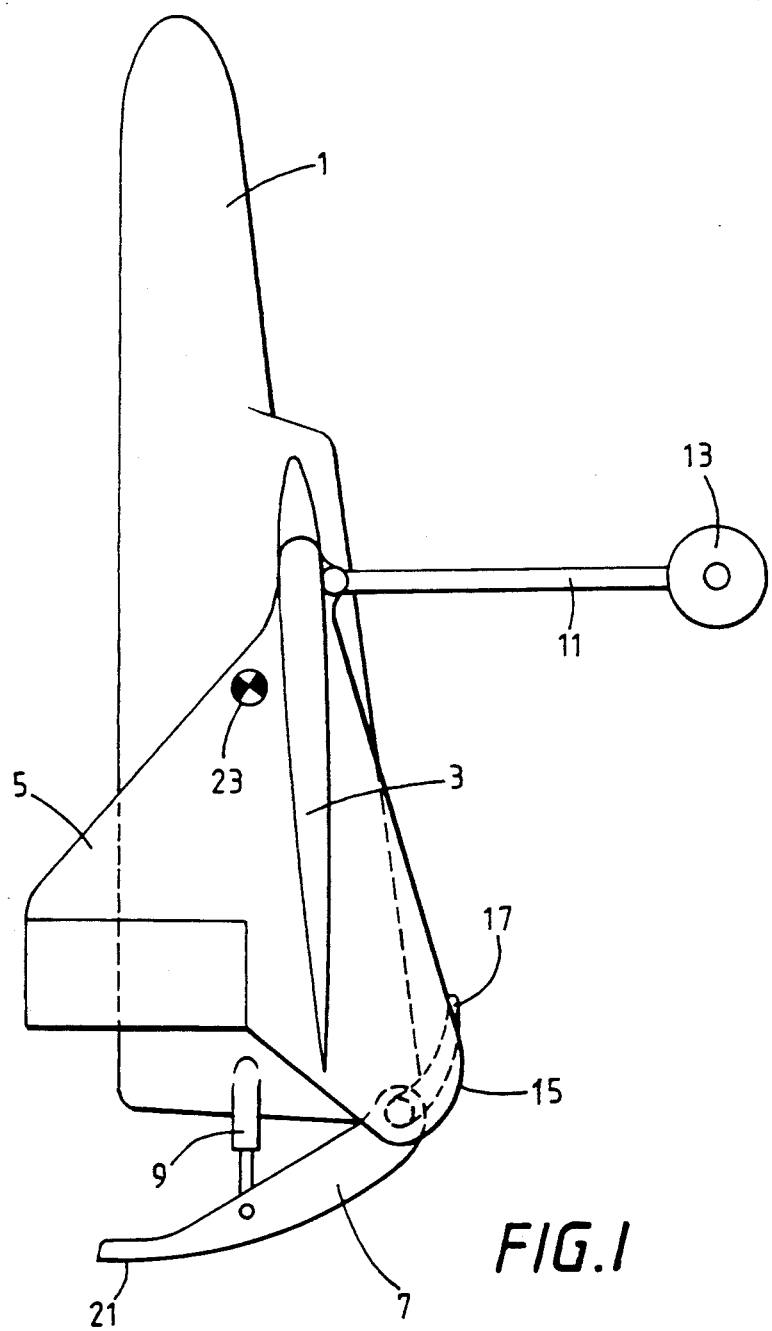
FIG. 1 is a side view of the aircraft in landing attitude at a first stage during landing.
Figure 2:
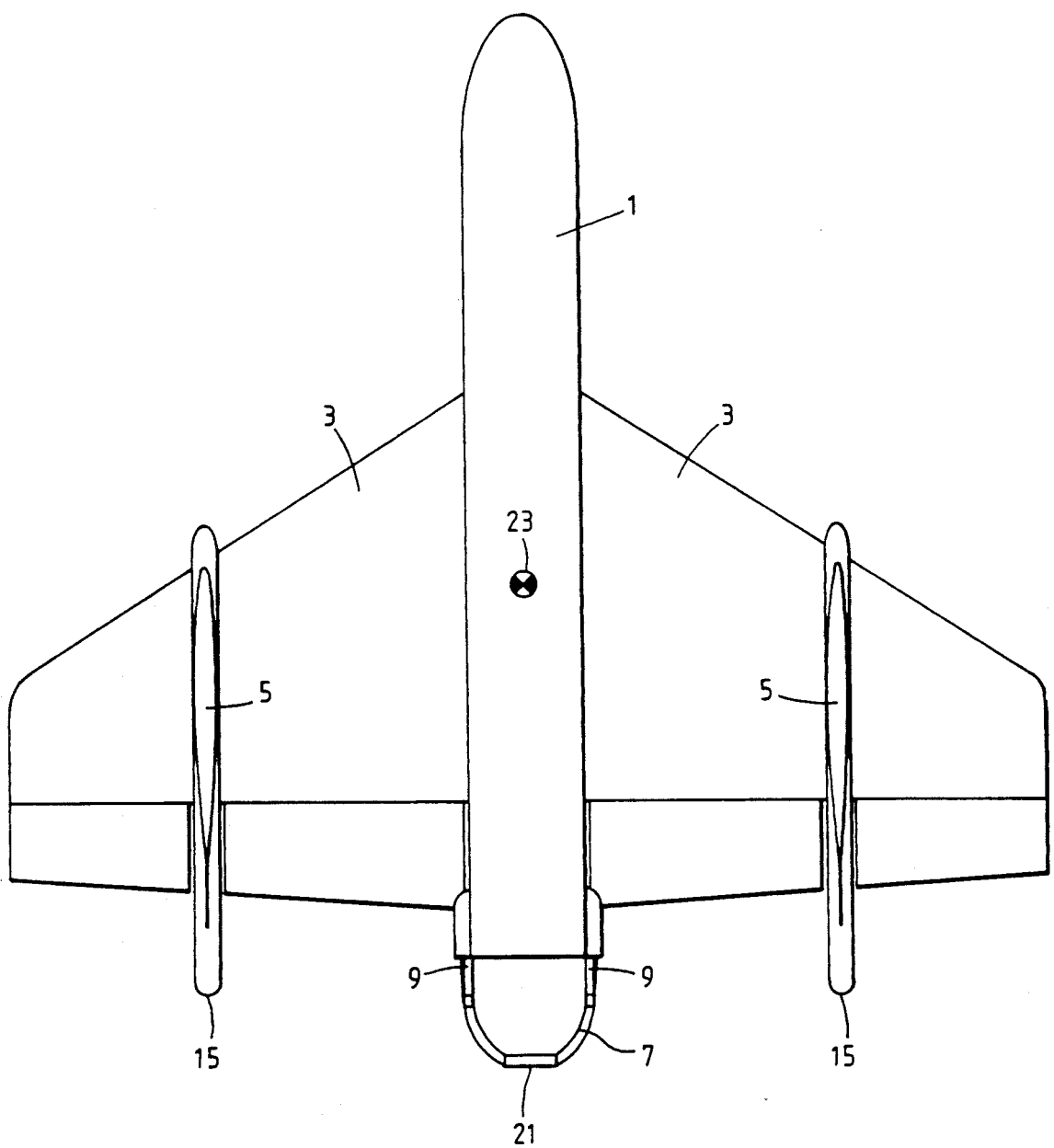
FIG. 2 is a plan view of the aircraft in the same attitude and at the same stage during landing as FIG. 1.

Referring first to FIGS. 1 and 2, the aircraft, has a fuselage 1 and two wings 3, each of which carries a fin 5. The aircraft is propelled by means (not shown) such as one or more propellers at the forward end of the fuselage 1 or by a jet engine. A U-shaped member 7 is pivotally mounted on the rear end of the fuselage 1 for rotation about an axis orthogonal to the length of the fuselage and generally parallel to the wings 3. The pivotal axis is on the underside of the fuselage with the U-shaped member 7 extending rearwardly and upwardly from the fuselage 1, the member 7 being supported by two telescopic shock absorbers 9 each connected between the mid-point of a respective one of the limbs of the member 7 and the corresponding side of the fuselage 1.

The aircraft further includes an undercarriage in the form of two struts 11, each pivoted at one end to the underside of a respective one of the wings 3 adjacent the forward edge of the fin 5 on that wing 3, and each having a wheel or skid 13 at its other end.

The fins 5 each extend an appreciable distance below the wings 3 towards the rear end of the fuselage to form lateral buffers 15 whose purpose is described below.

The aircraft is also provided with an arrester hook 17 at the rear end of the fuselage 1.

Figure 3:
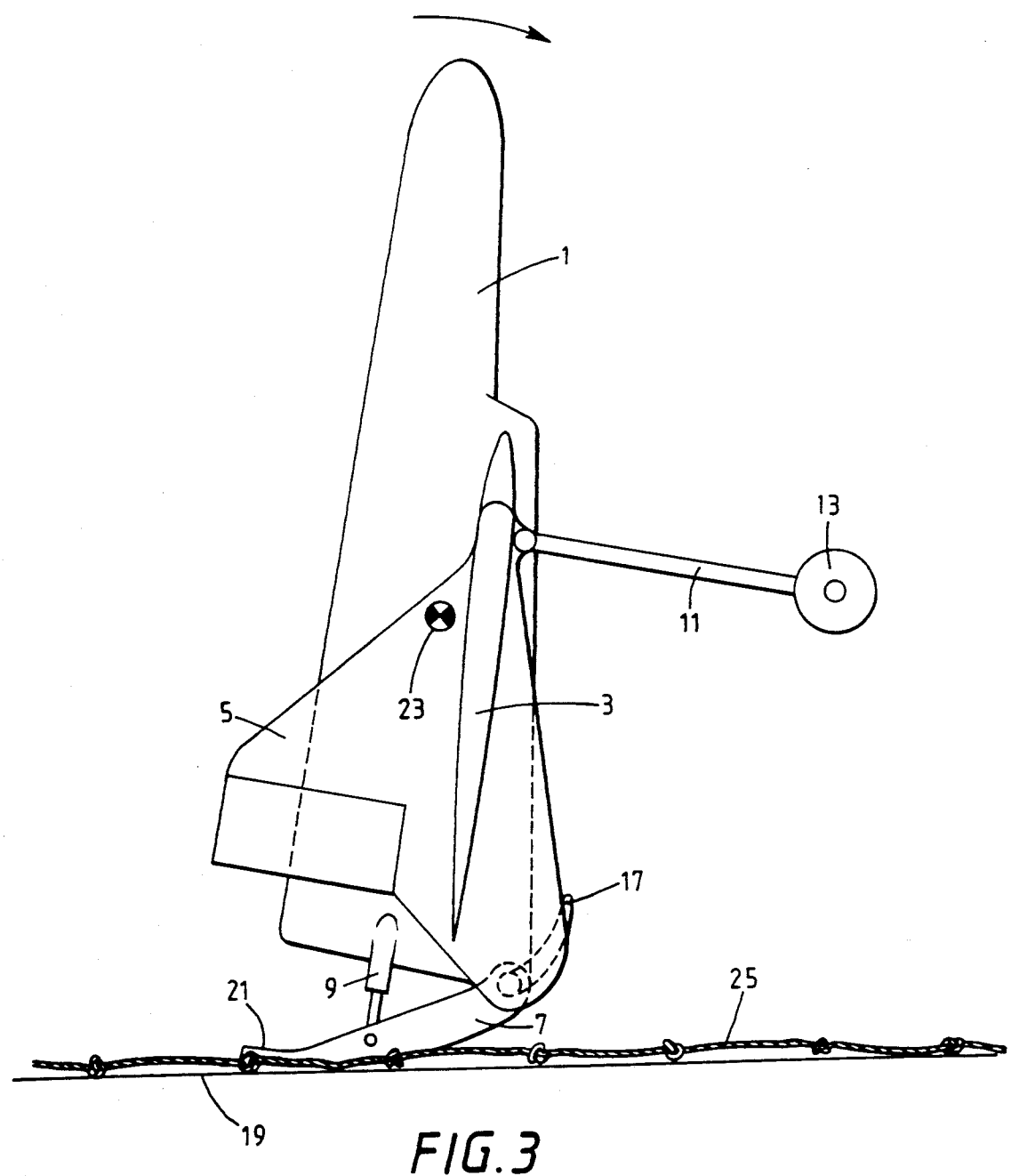
FIGS. 3, 4 and 5 are side views of the aircraft at second, third and fourth stages during landing.
Figure 4:
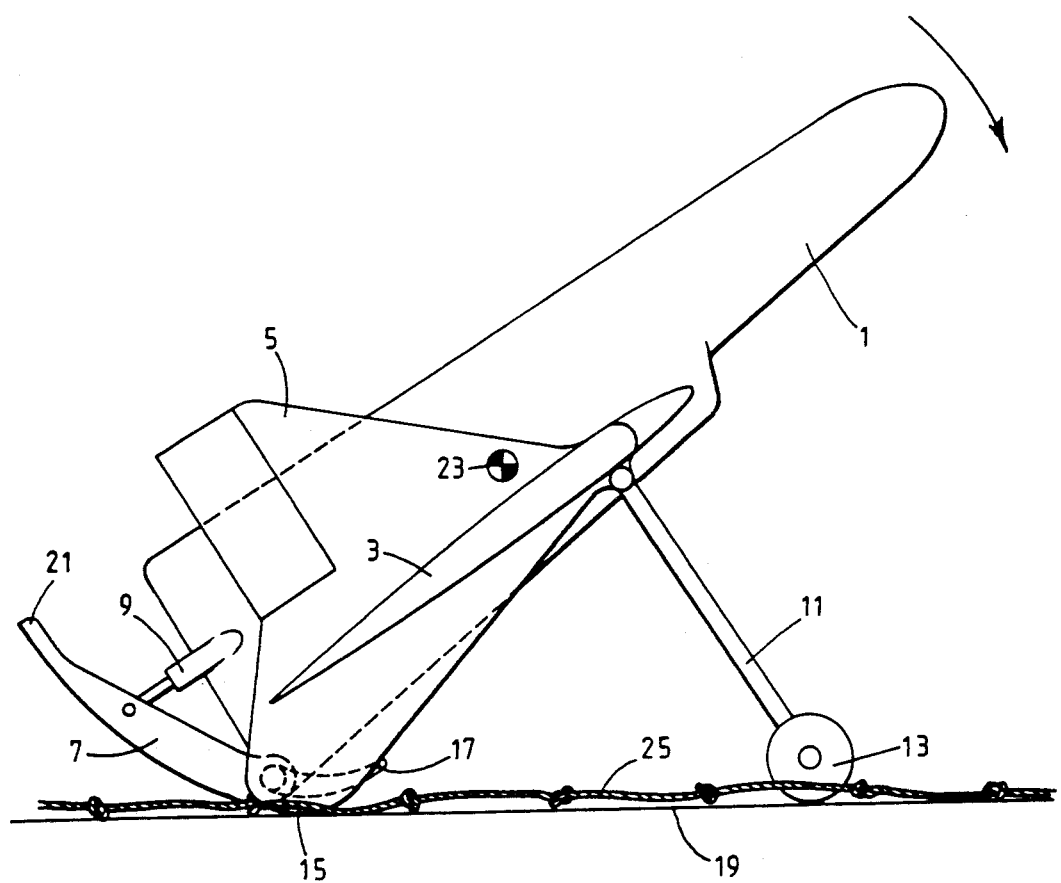

Referring now to FIG. 3, when landing the aircraft approaches the landing surface 19 tail first with its fuselage 1 in a generally vertical attitude. The first part of the aircraft to touch down on the surface 19 will thus be the end portion 21 of the member 7, the shock absorbers 9 cushioning the impact. The touchdown area portion 21 of the member 7 is offset from a line passing along the length of the aircraft fuselage 1 through the centre of gravity 23 of the aircraft in a direction away from the undercarriage 11, 13. Thus, after touchdown, the aircraft starts to topple under the action of gravity in a direction (indicated by the arrow in FIG. 3) such as to bring the wheels 13 of the undercarriage into contact with the landing surface 19, as shown in FIG. 4. The struts 11 are of a length such that the wheels 13 contact the surface 19 at an early stage of toppling before the aircraft has built up a large angular momentum.

The lateral buffers 15 serve to prevent appreciable sideways toppling of the aircraft, but are positioned sufficiently forward of the member 7 (i.e. above the member 7 during landing) to ensure that the end portion 21 of the member 7 touches down first on the landing surface 19, even if the surface 19 is uneven.

At about the time the wheels 13 contact the surface 19, the lateral buffers 15 also contact the surface 19 thus bringing the aircraft into four-point contact with the surface 19.

Figure 5:
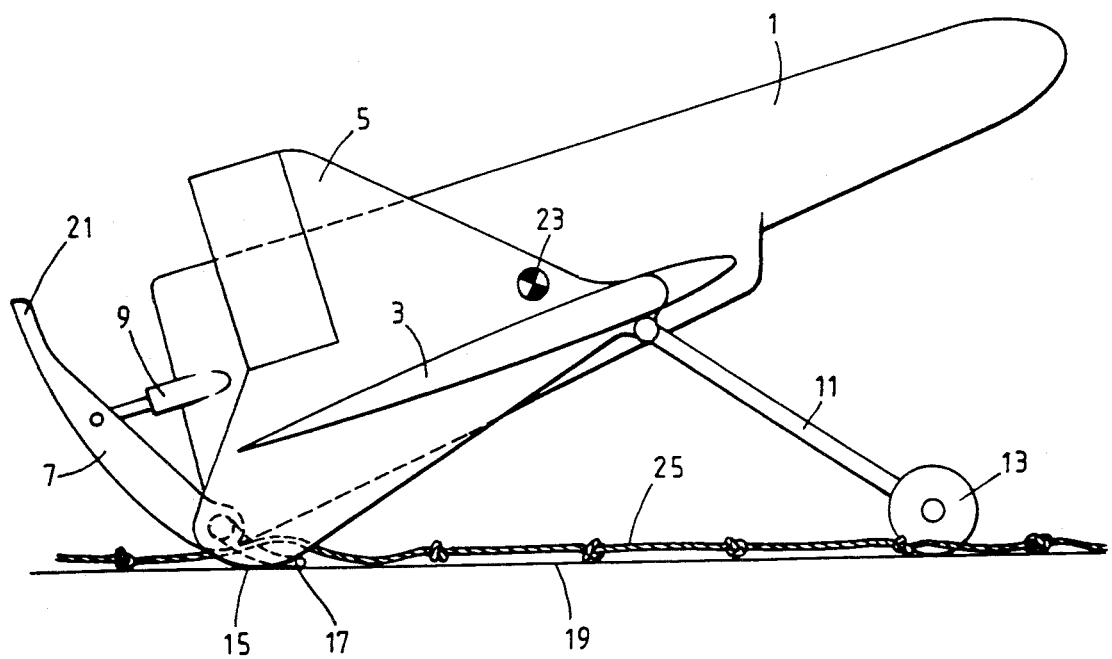

After the wheels 13 have contacted the landing surface 19 the struts 11 pivot forwardly moving the wheels 13 towards the nose of the aircraft, and hence well forward of the aircraft centre of gravity 23, the aircraft thus eventually achieving a more stable four-point contact with the landing surface and a low centre of gravity as shown in FIG. 5. The struts 11 are arranged to pivot against a resisting force so as to cushion the impact of the undercarriage with the landing surface 19.

The hook 17 is provided to restrain the aircraft when in the position shown in FIG. 5 against residual engine thrust when normal friction forces are insufficient for this purpose, e.g. if the landing surface 19 is the wet or slippery deck of a ship. The hook 17 is positioned so as to engage with a co-operating net 25, wires or other arrester system on the landing surface 19, and so hold the aircraft as its thrust vector gains an increasing horizontal component as the aircraft topples towards the position shown in FIG. 5.

I claim:

1. A vertical take-off and landing aircraft, comprising: a center of gravity, an elongated fuselage, an undercarriage means, a tail, a nose, and a touchdown area at said tail, said touchdown area being located, when the aircraft lands tail-first in a generally vertical attitude relative to a generally horizontal landing surface, at a position offset from a line extending along the length of the fuselage through the center of gravity of the aircraft, said aircraft toppling under the action of gravity, after the touchdown area contacts the landing surface, to bring the undercarriage means into contact with the landing surface, at a relatively early stage of toppling, said undercarriage means being movable with respect to the fuselage so that as the aircraft topples further, a contact area between the landing surface and the undercarriage means moves toward the nose of the aircraft, thereby to attain a stable landed position.

2. An aircraft according to claim 1 wherein said touchdown area is provided on a member resiliently mounted on said fuselage to cushion the impact of the aircraft with said landing surface.

3. An aircraft according to claim 2 wherein said member is pivotally mounted on the aircraft fuselage.

4. An aircraft according to claim 1 wherein said member is connected to said fuselage by way of a pivotal connection from which said member extends rearwardly and upwardly.

5. An aircraft according to claim 1 wherein said undercarriage means incorporates means for cushioning the impact of the undercarriage means with the landing surface.

6. An aircraft according to claim 1 wherein said aircraft has wings that have an underside, and said undercarriage means is pivotally mounted on said underside of the wings.

7. An aircraft according to claim 1 further comprising buffer means for limiting, by contact with the landing surface, the possible degree of toppling of the aircraft in directions other than that required to bring the undercarriage means into contact with the landing surface.

8. An aircraft according to claim 7 wherein said buffer means comprises two buffer areas for contacting the landing surface, one on either side of the fuselage.

9. An aircraft according to claim 8 wherein said aircraft has wings and said buffer means is carried by said wings.

10. An aircraft according to claim 9 wherein the wings of the aircraft carry fins and said buffer areas are provided by downward extensions of said fins.

11. An aircraft according to claim 1 further including a hook adapted to engage an arrester on the landing surface to inhibit movement of the aircraft across the landing surface, when in the landed position.

* * * * *